(12) United States Patent
Crawford et al.

(10) Patent No.: US 9,839,856 B2
(45) Date of Patent: Dec. 12, 2017

(54) METHOD AND SYSTEM FOR PROVIDING INTERACTIVITY BASED ON SENSOR MEASUREMENTS

(75) Inventors: David Crawford, Long Beach, CA (US); David Durham, Northridge, CA (US); Jon Georges, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1905 days.

(21) Appl. No.: 12/075,478

(22) Filed: Mar. 11, 2008

(65) Prior Publication Data

US 2009/0234666 A1    Sep. 17, 2009

(51) Int. Cl.
| | |
|---|---|
| *A63G 4/00* | (2006.01) |
| *A63G 25/00* | (2006.01) |
| *A63G 31/02* | (2006.01) |
| *G05B 13/00* | (2006.01) |
| *A63G 1/00* | (2006.01) |
| *A63G 3/00* | (2006.01) |

(Continued)

(52) U.S. Cl.
CPC ............ *A63G 31/02* (2013.01); *A63G 1/00* (2013.01); *A63G 3/00* (2013.01); *A63G 4/00* (2013.01); *A63G 5/00* (2013.01); *A63G 7/00* (2013.01); *A63G 9/00* (2013.01); *A63G 11/00* (2013.01); *A63G 13/00* (2013.01); *A63G 15/00* (2013.01); *A63G 17/00* (2013.01); *A63G 19/00* (2013.01); *A63G 21/00* (2013.01); *A63G 23/00* (2013.01); *A63G 25/00* (2013.01); *A63G 27/00* (2013.01); *A63G 31/00* (2013.01); *A63J 25/00* (2013.01); *G05B 13/00* (2013.01); *G06Q 10/103* (2013.01)

(58) Field of Classification Search
CPC ................................ A63G 31/02; G05B 13/00
USPC ................. 705/1, 1.1, 500; 463/1; 472/137; 700/275
See application file for complete search history.

(56) References Cited

U.S. PATENT DOCUMENTS

| | | | |
|---|---|---|---|
| 2,282,763 A | 5/1942 | Kennedy | |
| 5,362,069 A | 11/1994 | Hall-Tipping | |

(Continued)

FOREIGN PATENT DOCUMENTS

| | | |
|---|---|---|
| CN | 1077135 | 10/1993 |
| CN | 1586078 | 2/2005 |

(Continued)

*Primary Examiner* — Lynda Jasmin
*Assistant Examiner* — Tamara Griffin
(74) *Attorney, Agent, or Firm* — Farjami & Farjami LLP

(57) ABSTRACT

There is provided a system for providing interactivity to a guest of an experiential venue, based on sensor measurement of the guest. The system comprises a sensor configured to sense a guest variable of the guest, where the sensor may be a biometric sensor, a facial recognition sensor, a voice stress analysis sensor, a gesture recognition sensor, a motion tracking sensor, or an eye tracking sensor, and may sense heart rate or another guest variable. The system also comprises a control system, which may be implemented as a computer, in communication with the sensor. The control system is configured to determine a guest state from the guest variable, and to modify a venue variable, for example by selecting a path a theme park ride follows. The control system modifies the venue variable according to the guest state to provide increased satisfaction to the guest of the experiential venue.

17 Claims, 2 Drawing Sheets

(51) Int. Cl.
  *A63G 5/00* (2006.01)
  *A63G 7/00* (2006.01)
  *A63G 9/00* (2006.01)
  *A63G 11/00* (2006.01)
  *A63G 13/00* (2006.01)
  *A63G 15/00* (2006.01)
  *A63G 17/00* (2006.01)
  *A63G 19/00* (2006.01)
  *A63G 21/00* (2006.01)
  *A63G 23/00* (2006.01)
  *A63G 27/00* (2006.01)
  *A63G 31/00* (2006.01)
  *A63J 25/00* (2009.01)
  *G06Q 10/10* (2012.01)

(56) References Cited

U.S. PATENT DOCUMENTS

| | | |
|---|---|---|
| 5,527,239 A | 6/1996 | Abbondanza |
| 6,179,619 B1 * | 1/2001 | Tanaka ............... A63G 7/00 434/307 R |
| 6,572,511 B1 | 6/2003 | Volpe |
| 6,734,845 B1 * | 5/2004 | Nielsen ............... G06F 1/3209 345/211 |
| 7,497,784 B2 * | 3/2009 | Henry ............... A63G 3/02 441/65 |
| 7,577,636 B2 * | 8/2009 | Fernandez ........ G06F 17/30017 |
| 2002/0183667 A1 | 12/2002 | Kitadou |
| 2007/0100666 A1 * | 5/2007 | Stivoric ............. G01R 29/0814 705/3 |
| 2007/0106484 A1 * | 5/2007 | Sweatman et al. ........... 702/188 |
| 2007/0167689 A1 * | 7/2007 | Ramadas ............. A61B 5/0002 600/300 |
| 2008/0167757 A1 * | 7/2008 | Kanevsky ............... G07C 5/085 701/1 |

FOREIGN PATENT DOCUMENTS

| | | | |
|---|---|---|---|
| JP | H 6-209 | 1/1994 | |
| JP | 10-309381 | 11/1998 | |
| JP | 11-39564 | 2/1999 | |
| JP | 2001-340657 | 12/2001 | |
| WO | WO 9900782 | 1/1999 | |
| WO | WO 0169830 A2 * | 9/2001 | ............... A63H 3/28 |

* cited by examiner

METHOD AND SYSTEM FOR PROVIDING INTERACTIVITY BASED ON SENSOR MEASUREMENTS

BACKGROUND OF THE INVENTION

1. Field of the Invention

The present invention relates generally to sensors and control systems. More particularly, the present invention relates to providing interactivity with sensors and control systems.

2. Background Art

People seek out entertainment at a wide variety of different experiential venues. For example, some people take pleasure in watching a movie in a movie theater, other people enjoy walking through a museum, while still other people attend theme parks to go on theme park rides. These experiential venues all share the characteristic of being well suited for entertaining large groups of people. Movie theaters can seat groups of hundreds of people every several hours, museums can accommodate thousands of people each day, and theme parks can handle tens of thousands of people each weekend. While entertaining large numbers of people is a laudable achievement, conventional entertainment techniques utilized in these experiential venues provide very little interactivity or personalization.

The lack of interactivity or personalization leads to dissimilar personal experiences among experiential venue guests. For example, guests at a movie theater who each see the same movie may have different levels of enjoyment because of their varying tastes. Guests walking through a particular circuit of an art museum each experience the exhibits in a similar order and from a similar perspective, when they might instead enjoy the artwork more in different orders and from different perspectives. Guests on a theme park ride may experience fear or boredom according to their relative sensitivities, but must all take the same ride. In each example, the experiential venue fails to interact with or provide personalization for its guests, and thus some guests' personal experiences are poorer than they could have otherwise been.

Several solutions to this failure of interactivity or personalization have been advanced. Such solutions often begin by acquiring guest feedback. For example, one solution equips theme park ride cars with buttons or joystick controls so that guests can control a ride factor, such as which path a ride takes among several alternative paths. This solution has several drawbacks. For instance, such controls are obtrusive, and require the guest to be distracted from the experience of the ride in order to operate the controls. Another disadvantage of using such controls that measure intentional inputs from the guest is that the guest has an opportunity to misrepresent his own feelings or make an error, thereby reducing the satisfaction he receives from the ride.

Accordingly, there is a need to overcome the drawbacks and deficiencies in the art by offering an improved method or system for providing the guests with interactive and personalized entertainment experiences.

SUMMARY OF THE INVENTION

There are provided methods and systems for providing interactivity based on sensor measurements, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
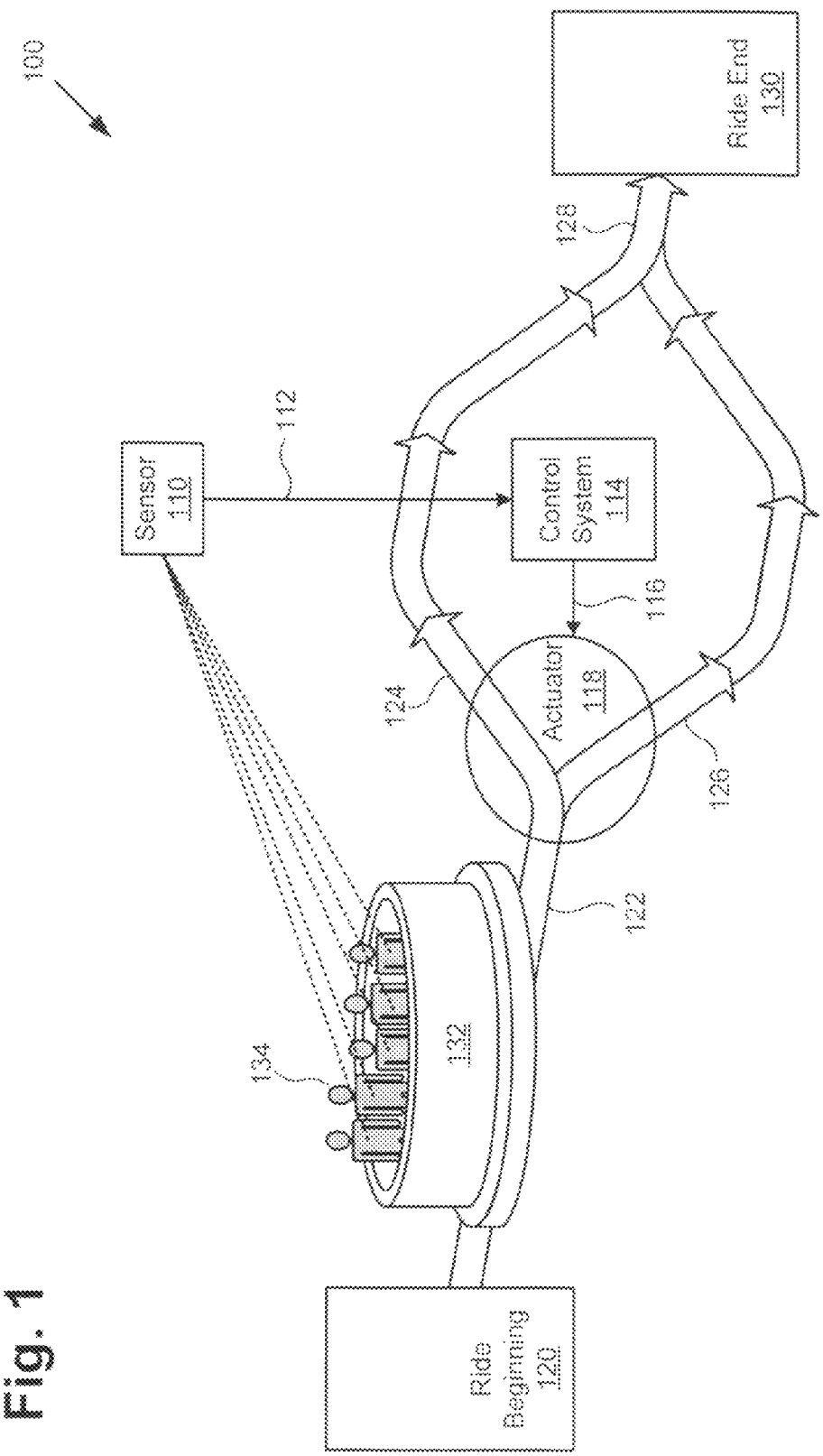
FIG. 1 shows a diagram of an exemplary system for providing interactivity based on sensor measurements, according to one embodiment of the present invention.

The present application is directed to methods and systems for providing interactivity based on sensor measurements. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows system 100 for providing interactivity based on sensor measurements, according to one embodiment of the present invention. System 100 comprises an experiential venue including car 132, ride beginning 120, and ride end 130. Car 132 carries guests including guest 134 between ride beginning 120 and ride end 130, respectively, on ride segments 122, 124, 126, and 128, which are theme park ride paths. Ride segments 124 and 126, labeled in FIG. 1 as Paths A and B, respectively, are alternate segments that car 132 may follow. System 100 also includes sensor 110, control system 114, and actuator (or selector) 118 that communicate via links 112 and 116.

In this embodiment, system 100 is an experiential venue in the form of a haunted house theme park ride designed to put guests such as guest 134 in a state of fear. System 100 puts guests in a state of fear by exposing guests to various haunted house features. Car 132 is a car on the haunted house theme park ride. Car 132 is configured to seat several guests including guest 134. In other embodiments, car 132 could be configured to seat only one person, be configured to carry people standing up, or be configured as more than one car. Guest 134 can board car 132 at ride beginning 120 and disembark from car 132 at ride end 130.

As car 132 moves from ride beginning 120 to ride end 130, guest 134 is exposed to haunted house features (not shown) that are designed to alter the guest state of guest 134 to a state of fear. For example, on ride segment 122 guest 134 is exposed to animated figures, such as haunted house skeletons and zombies. In other embodiments, the haunted house features may be played by live actors wearing costumes, or may be shown on television screens. As guest 134 is exposed to the animated figures, guest 134 will experience an amount of fear proportional to guest 134 factors such as, for example, age and ability to suspend disbelief.

Sensor 110 is configured to measure a guest variable of guest 134 as car 132 follows ride segment 122. In this embodiment, sensor 110 is a biometric sensor that can measure the heart rate of guest 134 from a distance without being in physical contact with guest 134. Thus, sensor 110 does not need to be attached to car 132 on, for example, the seat guest 134 is sitting in, but in some embodiments sensor 110 may be attached car 132 or the seat. Sensor 110 is wall-mounted in a fixed location and oriented to observe guest 134 as car 132 passes by.

In the present embodiment, sensor 110 is a biometric sensor for measuring a heart rate, but in other embodiments sensor 110 could be implemented to measure different guest variable biometric characteristics, such as skin temperature or perspiration. Additionally, instead of being implemented to measure a biometric guest variable, sensor 110 could be implemented as a nonbiometric facial recognition sensor, voice stress analysis sensor, gesture recognition sensor, motion tracking sensor, or eye tracking sensor.

Sensor 110 sends the measured heart rate guest variable of guest 134 to control system 114 via link 112. In this embodiment, link 112 directly couples sensor 110 to control system 114, but in other embodiments sensor 110 may be in communication with control system 114 via a wireless connection or a connection made over a computer network. In embodiments like system 100 in which car 132 is configured to carry more than one guest, sensor 110 can be configured to send the individual heart rate of each guest, the average heart rate of all guests, or another function of the heart rates of the guests in car 132.

Control system 114 is a computer that receives and processes guest variable measurements from sensor 110. In this embodiment, control system 114 is configured to process heart rate measurements to determine if they indicate a guest state of fear. Typically, a guest in a state of repose has a low heart rate, while a guest in an elevated emotional state such as fear has a high heart rate. Thus, if guest 134 has a high heart rate, guest 134 has probably been frightened by viewing, for example, the haunted house features designed to produce fear. In contrast, if guest 134 has a low heart rate, guest 134 probably found the haunted house features boring.

In embodiments of the invention in which sensor 110 is not configured as a biometric sensor, control system 114 can still be configured to determine if guest 134 has experienced fright. For example, in an embodiment in which sensor 110 is configured as a facial recognition sensor, control system 114 may analyze the facial expression guest variable of guest 134. A facial expression exhibiting wide-open eyes or persistently closed eyes may indicate a guest state of fright, while a facial expression exhibiting eyes opened an ordinary amount may indicate a guest state of repose. Thus, control system 114 can determine the guest state of guest 134 utilizing a variety of sensor 110 types.

After determining the guest state of guest 134 by analyzing the guest variable measured by sensor 110, control system 114 may modify a venue variable by reconfiguring actuator 118. Control system 114 is in communication with actuator 118 via link 116, which may be, in various embodiments, a wired connection, a wireless connection, or a computer network connection. Actuator 118 is an electrically activated ride track selector, and may be configured in a first configuration to route car 132 to ride segment 124, and in a second configuration to route car 132 to ride segment 126. Ride segments 124 and 126 are physically distinct, and guest 134 in car 132 will be exposed to different haunted house features on ride segments 124 and 126. In this embodiment, ride segment 124 has less-frightening animated figures, while ride segment 126 has more-frightening animated figures.

Control system 114 configures actuator 118 to route car 132 to ride segment 124 or 126 based on how frightened guest 134 is. If the heart rate measurements from sensor 110 indicate that guest 134 is frightened, control system 114 will route car 132 to less-frightening ride segment 124. In contrast, if the heart rate measurements indicate that guest 134 is bored, control system 114 will route car 132 to more-frightening ride segment 126. In this fashion, control system 114 either maintains an appropriate level of fear if guest 134 is already frightened, or exposes guest 134 to more-frightening haunted house features if guest 134 is bored. By thus controlling the guest state of guest 134 state, system 100 provides increased satisfaction to guest 134.

In the present embodiment, actuator 118 is an electrically activated ride track selector for routing car 132 to ride segment 124 or 126, but in other embodiments actuator 118 could be implemented to control a different venue variable. For example, if implemented with an appropriate sensor 110 and control system 114, actuator 118 can extend or shorten the length of the ride by controlling the speed of car 132. Actuator 118 could also activate or deactivate a specific ride element, such as a special effect, animated character, ride scene, or ride environmental control. Actuator 118 could also be implemented to control various onboard aspects of car 132, such as audio, video, or lighting devices installed on car 132, or motion base or rotation devices installed on car 132. Actuator 118 may additionally be implemented as a hardware or software control that tracks an interactive score based on ride participation by guest 134. In yet other embodiments, actuator 118 may be implemented to control still other venue variables.

Ride segments 124 and 126 rejoin at ride segment 128. Thus, after following ride segment 124 or 126, car 132 follows ride segment 128 to ride end 130. Ride segment 128 is the final portion of the haunted house ride, which in this embodiment does not include additional haunted house features. After disembarking at ride end 130, guest 134 may leave, or may return to ride beginning 120 to take the ride again.

Figure 2:
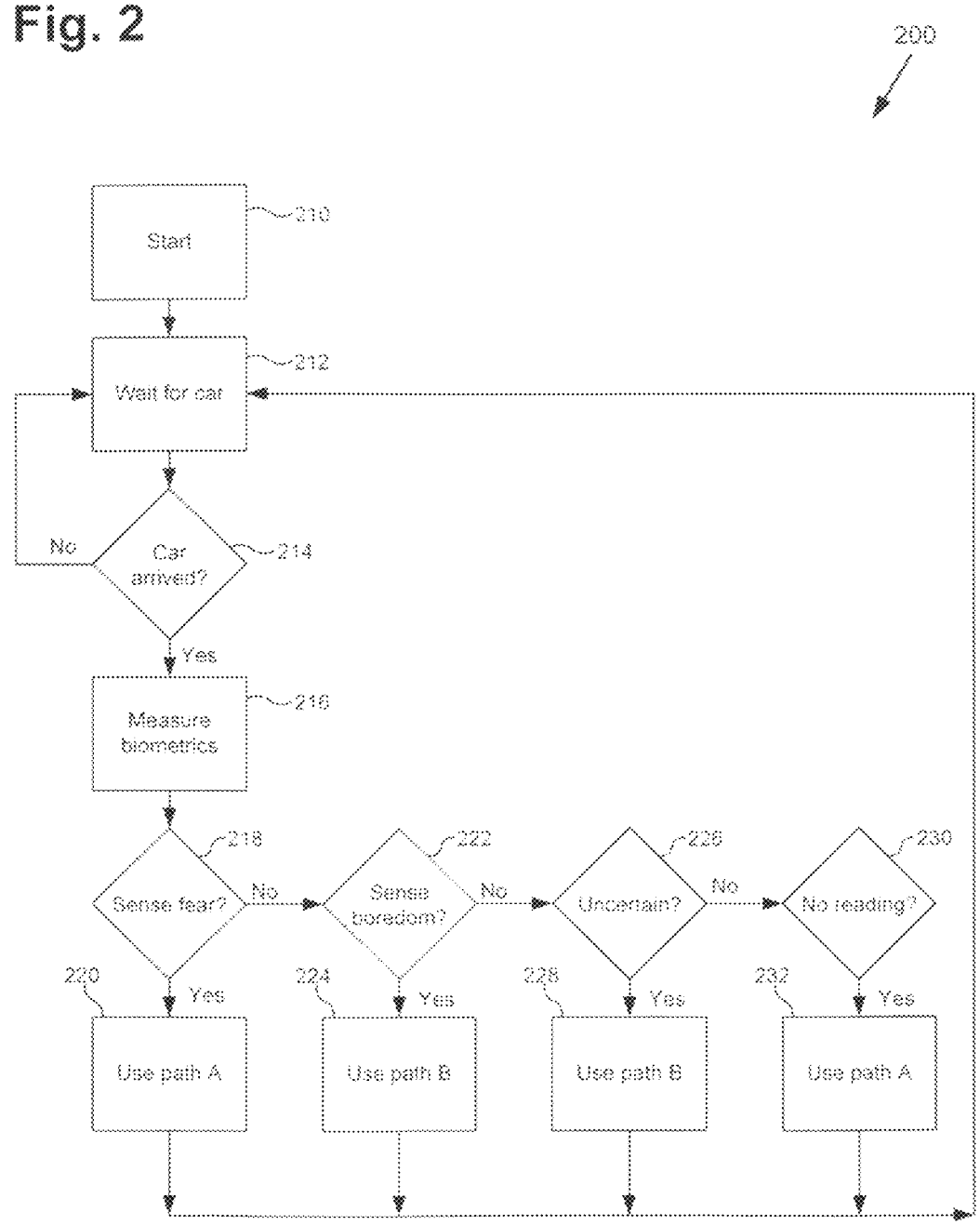
FIG. 2 is a flowchart presenting a method for providing interactivity based on sensor measurements, according to one embodiment of the present invention.

FIG. 2 shows flowchart 200 of an exemplary method for providing interactivity based on sensor measurements, according to one embodiment of the present invention. Certain details and features have been left out of flowchart 200 that are apparent to a person of ordinary skill in the art. For example, a step may comprise one or more substeps or may involve specialized equipment or materials, as known in the art. While steps 210 through 232 indicated in flowchart 200 are sufficient to describe one embodiment of the present invention, other embodiments of the invention may utilize steps different from those shown in flowchart 200.

In step 210 of flowchart 200, initial conditions for the method for personalizing a guest experience based on sensor measurements are established. For example, a guest corresponding to guest 134 boards a car corresponding to car 132. The car begins moving from the boarding location, which corresponds to ride beginning 120, to an end location corresponding to ride end 130. As the car moves, the guest is exposed to various haunted house features, corresponding to the animated figures of system 100. A sensor corresponding to sensor 110 is oriented to observe a ride segment corresponding to ride segment 122, a control system corresponding to control system 114 receives the sensor measurements, and an actuator corresponding to actuator 118 is controlled by the control system.

In steps 212 and 214 of flowchart 200, the control system waits for the car to come into range of the sensor. So long as the car has not come into range, the control system waits, as illustrated in the loop back from step 214 to 212. After the car comes into range, the sensor transmits guest variable measurements to the control system, as illustrated in the transition from step 214 to 216.

In step 216 of flowchart 200, the car has arrived on the ride segment in range of the sensor, and the sensor begins measuring a guest variable. In this embodiment of the invention, the sensor is a biometric sensor that measures a heart rate, but like sensor 110, in other embodiments the sensor could measure biometrics such as skin temperature or perspiration. Additionally, the sensor could be configured as a facial recognition sensor, a voice stress analysis sensor, a gesture recognition sensor, a motion tracking sensor, or as an eye tracking sensor. In this embodiment, the sensor measures the guest heart rate and transmits the heart rate to the control system via a link corresponding to link 116.

In step 218 of flowchart 200, the control system has received a heart rate measurement from the sensor, and proceeds to process the heart rate measurement to determine whether it indicates, for example, a guest state of fear or boredom. As in system 100, a person in a state of repose typically has a low heart rate, while a person in a state of fear typically has a high heart rate. Thus, based on the heart rate of the guest, the control system can determine whether the guest is experiencing a guest state of fear after being exposed to the haunted house features. If the guest is experiencing fear, as suggested by a high heart rate, flowchart 200 proceeds to step 220, but if the guest is not, flowchart 200 proceeds to step 222.

In step 220 of flowchart 200, the control system has determined that the guest is experiencing fear, and has consequently modified a venue variable by configuring the actuator to route the car to path A, corresponding to ride segment 124 in system 100. Like ride segments 124 and 126, paths A and B are physically distinct and expose guests to different haunted house features. On path A, an already-frightened guest will be exposed to less-frightening figures that are calculated to maintain the guest state of fear already determined by the control system. After step 220, flowchart 200 loops back to step 212 to wait for another car.

In step 222 of flowchart 200, the control system has been unable to determine that the guest is experiencing fear, and next attempts to determine if the guest is experiencing boredom. If the guest has a low heart rate indicating a guest state of boredom, the control system modifies a venue variable by configuring the actuator to route the car to path B in step 224. Instead, if the guest has an intermediate heart rate that is higher than a heart rate indicating boredom, but still lower than a heart rate indicating fear, the flowchart proceeds to step 226.

In step 224 of flowchart 200, the control system has determined that the guest is experiencing a guest state of boredom, and has configured the actuator to route the car to path B, corresponding to ride segment 126 in system 100. In contrast with path A, where an already-frightened guest is exposed to less-frightening figures, on path B the bored guest is exposed to more-frightening figures. By doing so, the bored guest may experience more fear, and thus ultimately be provided increased satisfaction from the haunted house experiential venue. After step 224, flowchart 200 loops back to step 212 to wait for another car.

In step 226 of flowchart 200, the control system is unable to determine the guest state based on the measured guest variable heart rate, because the heart rate is in an intermediate range. In this situation, the control system can implement one of several ride policies. The control system might, for example, modify a venue variable by configuring the actuator to direct the car onto either path A or B at random. By selecting a path at random, the theme park ride ensures a varied experience for guests in an indeterminate guest state. Alternatively, the control system may be implemented to select the path that has experienced less overall ride traffic, in order to equalize path wear. In this embodiment, the control system defaults to path B when the heart rate is in an intermediate range, to make the ride more frightening for every guest. When defaulting to path B for an intermediate heart rate, flowchart 200 proceeds to step 228, and then loops back to step 212 to wait for another car. If there is no heart rate reading at all, the flowchart proceeds to step 230.

In step 230 of flowchart 200, the sensor can detect no heart rate from a guest in the car. This situation might occur, for example, when an empty car is sent into the haunted house. An empty car should pass through the haunted house to the ride end quickly for reuse, and this can be accomplished by routing the empty car to the shorter path. Thus, if path A is shorter, in this embodiment the control system routes empty cars to path A in step 232, and then loops back to step 212 to wait for another car.

In embodiments different than those depicted in systems 100 and 200, the invention's experiential venue may take the form of, for example, a walk-through experience such as a shopping mall. Storefront displays in the shopping mall can be equipped with motion tracking sensors that measure a guest variable of which storefront display the guest is moving towards. A control system can then determine a guest state of which storefront display the guest finds appealing, and can modify a venue variable embodied by a lighting control, thereby activating a light source in the appealing storefront display.

In another embodiment, the invention's experiential venue may take the form of a location-based entertainment venue, such as a high-end arcade. In a high-end arcade, groups of guests may participate together in an emotion-based video game experience. The video game can be equipped with a voice stress analysis sensor to measure a guest variable of the amount of stress in the guests' voices. A control system can then determine a guest state of, for example, group excitement, and can modify a venue variable embodied as a video game intensity control, in order to increase or decrease game intensity and thereby provide increased satisfaction to the group of guests.

In another embodiment, the invention's experiential venue may take the form of an in-home movie-watching venue, such as a home entertainment center. A guest of the home entertainment center may use it to watch, for example, a movie incorporating multiple plot lines. The home entertainment center can be equipped with a gesture recognition sensor to measure a guest variable in the form of a gesture indicating a home entertainment center playback command. A control system can then determine a guest state of, for example, a desire to fast forward or pause the movie playback based on the gesture, and can modify a venue variable embodied as a home entertainment center playback control in order to give effect to the playback command. In yet another embodiment, the home entertainment center may include a sensor for monitoring the heart rate of the viewer, an eye of the viewer or a facial expression of the viewer to determine whether the viewer is in the state of fear, laughter, etc., and modify the plot line of the movie, accordingly. For example, if the viewer is viewing a horror movie, and the viewer is not in the state of fear, when multiple plot lines exist at a segment of the movie, a plot line may be selected to place the viewer in the state of fear. On the other hand, if it is determined that the viewer is already in a high state of fear, a less scary plot line may be selected, as the movie proceeds from that segment.

The home entertainment center can also be equipped with an eye tracking sensor to measure a guest variable of which movie character the guest watches. For example, during movie playback, the guest may visually focus on different movie characters, depending on which characters the guest finds most interesting. A control system can then determine a character interest guest state, and can modify a venue variable embodied as a home entertainment center control to select a movie plot line that includes more scenes featuring the interesting character.

Thus, the present application discloses a system and method for providing interactivity based on sensor measurements. One embodiment of the system utilizes a biometric sensor for sensing a guest variable, a computer control system for determining a guest state based on the guest variable, and an electrically activated actuator for modifying a venue variable by routing a theme park ride car and guest to a path appropriate for the guest state of the guest. The sensor measures the heart rate of the guest from a distance, and the control system uses the heart rate measurement to determine whether the guest is frightened or bored. After making this determination, the control system can configure the actuator to guide the guest in his car to a more or less-frightening path, in order to personalize his experience and provide him increased satisfaction from the ride.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for providing interactivity to a guest of a theme park based on sensor measurement of the guest, the method comprising:
sensing, using a sensor, a variable characteristic of the guest located in a theme park ride and indicative of an emotional state of the guest, wherein the variable characteristic includes at least one or more of variable biometric and nonbiometric characteristics of the guest;
transmitting the variable characteristic of the guest indicative of the emotional state of the guest from the sensor to a control system;
analyzing the variable characteristic of the guest utilizing the control system;
indicating an emotional state of the guest based on analyzing the variable characteristic of the guest; and
modifying a one or more elements of the theme park ride by the control system using an actuator according to the guest emotional state, wherein the modifying of the one or more elements of the theme park ride is in direct response to the guest emotional state, and wherein the one or more elements of the theme park ride include at least one of a speed of the theme park ride, a length of the theme park ride, an onboard lighting device of a ride car of the theme park ride, an onboard audio of the ride car of the theme park ride, an onboard video of the ride car of the theme park ride, a ride scene of the theme park ride, a motion base device installed on the ride car and a rotation device installed on the ride car.

2. The method of claim 1, wherein the sensor includes one or more of a facial recognition sensor, a voice stress analysis sensor, a gesture recognition sensor, a motion tracking sensor, or an eye tracking sensor, and wherein the variable characteristic of the guest includes one or more of heart rate, skin temperature, perspiration, facial expression, or voice stress.

3. The method of claim 1, wherein modifying the one or more elements of the theme park ride is performed without measuring any intentional input from the guest.

4. A system for providing interactivity to a guest of a theme park based on sensor measurement of the guest, the system comprising:
a sensor configured to sense a variable characteristic of the guest located in a theme park ride and indicative of an emotional state of the guest, wherein the variable characteristic includes at least one or more of variable biometric and nonbiometric characteristics of the guest;
a transmitter configured to transmit the variable characteristic of the guest indicative of the emotional state of the guest from the sensor to a control system;
a control system configured to:
analyze the variable characteristic of the guest;
indicate an emotional state of the guest based on analyzing the variable characteristic of the guest; and
modify a one or more elements of the theme park ride by the control system using an actuator according to the guest emotional state, wherein the modifying of the one or more elements of the theme park ride is in direct response to the guest emotional state, and wherein the one or more elements of the theme park ride include at least one of a speed of the theme park ride, a length of the theme park ride, an onboard lighting device of a ride car of the theme park ride, an onboard audio of the ride car of the theme park ride, an onboard video of the ride car of the theme park ride, a ride scene of the theme park ride, a motion based device installed on the ride car and a rotation device installed on the ride car.

5. The system of claim 4, wherein the sensor includes one or more of a facial recognition sensor, a voice stress analysis sensor, a gesture recognition sensor, a motion tracking sensor, or an eye tracking sensor, and wherein the variable characteristic of the guest include one or more of heart rate, skin temperature, perspiration, facial expression, or voice stress.

6. The system of claim 4, wherein the control system is configured to modify the one or more elements of the theme park ride without measuring any intentional input from the guest.

7. A method of providing interactivity to a theme park ride based on sensor measurements of one or more guests in a ride car, the theme park ride having a plurality of ride segments include a ride beginning segment, a first ride alternate segment, a second ride alternate segment, and a ride end segment, the method comprising:
moving the ride car including the one or more guests in the ride beginning segment;
sensing, using a sensor, a variable characteristic of the one or more guests located in the ride car and indicative of an emotional state of the one or more guests while moving in the ride beginning segment, wherein the variable characteristic includes at least one or more of variable biometric and nonbiometric characteristics of the guest;

transmitting the variable characteristic of the one or more guests indicative of the emotional state of the one or more guests from the sensor to a control system;

analyzing the variable characteristic of the one or more guests using the control system indicating an emotional state of the one or more guests in the ride car based on analyzing the variable characteristic of the one or more guests in the ride car; and selecting, by the control system using an actuator, between one of the first ride alternate segment and the second ride alternate segment based on the emotional state of the one or more guests in the ride car; and moving the ride car including the one or more guests in the selected one of the first ride alternate segment and the second ride alternate segment, wherein the moving of the ride car in the selected one of the first ride alternate segment and the second ride alternate segment is to affect a physical change of the theme park ride in direct response to the emotional state of the one or more guests in the ride car.

8. The method of claim 7, wherein after moving the ride car including the one or more guests in the selected one of the first ride alternate segment and the second ride alternate segment, the method further comprising:

moving the ride car including the one or more guests in the selected one of the first ride alternate segment and the second ride alternate segment.

9. The method of claim 7, wherein the sensor includes one or more of biometric sensors having a facial recognition sensor, a voice stress analysis sensor, a gesture recognition sensor, a motion tracking sensor, or an eye tracking sensor.

10. The method of claim 7, wherein the variable characteristic includes one or more of heart rate, skin temperature, perspiration, facial expression, or voice stress.

11. The method of claim 7, wherein the sensor is located outside of the ride car.

12. The method of claim 7, wherein the sensor is not in physical contact with the one or more guests.

13. A method for providing interactivity to a guest of a theme park based on sensor measurement of the guest, the method comprising:

determining that the guest is within a sensing range of a sensor;

sensing, using the sensor and in response to the determining, a variable characteristic of the guest located in a theme park ride and indicative of an emotional state of the guest, wherein the variable characteristic includes at least one or more of variable biometric and nonbiometric characteristics of the guest;

transmitting the variable characteristic of the guest indicative of the emotional state of the guest from the sensor to a control system;

analyzing the variable characteristic of the guest utilizing the control system;

indicating an emotional state of the guest based on analyzing the variable characteristic of the guest; and modifying a one or more elements of the theme park ride by the control system using an actuator according to the guest emotional state, wherein the modifying of the one or more elements of the theme park ride is in direct response to the guest emotional state, and wherein the one or more elements of the theme park ride include at least one of a speed of the theme park ride, a length of the theme park ride, an onboard lighting device of a ride car of the theme park ride, an onboard audio of the ride car of the theme park ride, an onboard video of the ride car of the theme park ride, a ride scene of the theme park ride, a motion base device installed on the ride car and a rotation device installed on the ride car.

14. The method of claim 13, wherein modifying the one or more elements of the theme park ride is performed without measuring any intentional input from the guest.

15. A system for providing interactivity to a guest of a theme park based on sensor measurement of the guest, the system comprising:

a sensor configured to sense a variable characteristic of the guest located in a theme park ride and indicative of an emotional state of the guest, wherein the variable characteristic includes at least one or more of variable biometric and nonbiometric characteristics of the guest;

a transmitter configured to transmit the variable characteristic of the guest indicative of the emotional state of the guest from the sensor to a control system;

a control system configured to:

determine that the guest is within a sensing range of the sensor, prior to the sensor performing sensing the variable characteristic of the guest located in the theme park ride;

analyze the variable characteristic of the guest;

indicate an emotional state of the guest based on analyzing the variable characteristic of the guest; and modify a one or more elements of the theme park ride by the control system using an actuator according to the guest emotional state, wherein the modifying of the one or more elements of the theme park ride is in direct response to the guest emotional state, and wherein the one or more elements of the theme park ride include at least one of a speed of the theme park ride, a length of the theme park ride, an onboard lighting device of a ride car of the theme park ride, an onboard audio of the ride car of the theme park ride, an onboard video of the ride car of the theme park ride, a ride scene of the theme park ride, a motion base device installed on the ride car and a rotation device installed on the ride car.

16. A method of providing interactivity to a theme park ride based on sensor measurements of one or more guests in a ride car, the theme park ride having a plurality of ride segments include a ride beginning segment, a first ride alternate segment, a second ride alternate segment, and a ride end segment, the method comprising:

moving the ride car including the one or more guests in the ride beginning segment;

determining that the one or more guests are within a sensing range of a sensor;

sensing, using the sensor and in response to the determining, a variable characteristic of the one or more guests located in the ride car and indicative of an emotional state of the one or more guests while moving in the ride beginning segment, wherein the variable characteristic includes at least one or more of variable biometric and nonbiometric characteristics of the guest;

transmitting the variable characteristic of the one or more guests indicative of the emotional state of the one or more guests from the sensor to a control system;

analyzing the variable characteristic of the one or more guests using the control system indicating an emotional state of the one or more guests in the ride car based on analyzing the variable characteristic of the one or more guests in the ride car; and selecting, by the control system using an actuator, between one of the first ride alternate segment and the second ride alternate segment based on the emotional state of the one or more guests in the ride car; and moving the ride car including the one or more guests in the selected one of the first ride alternate segment and the second ride alternate segment.

17. The method of claim 16, wherein moving the ride car is performed without measuring any intentional input from the one or more guests.

* * * * *